(12) United States Patent
Takamatsu

(10) Patent No.: US 9,287,799 B2
(45) Date of Patent: Mar. 15, 2016

(54) POWER CONVERTER AND ILLUMINATION DEVICE USING THE POWER CONVERTER

(71) Applicant: PANASONIC CORPORATION, Osaka (JP)

(72) Inventor: Kenichi Takamatsu, Niigata (JP)

(73) Assignee: PANASONIC INTELLECTUAL PROPERTY MANAGEMENT CO., LTD, Osaka (JP)

( * ) Notice: Subject to any disclaimer, the term of this patent is extended or adjusted under 35 U.S.C. 154(b) by 309 days.

(21) Appl. No.: 13/759,332

(22) Filed: Feb. 5, 2013

(65) Prior Publication Data
US 2013/0229130 A1  Sep. 5, 2013

(30) Foreign Application Priority Data

Mar. 1, 2012  (JP) ................................. 2012-045013

(51) Int. Cl.
| | |
|---|---|
| G05F 1/00 | (2006.01) |
| H02M 7/44 | (2006.01) |
| H05B 37/02 | (2006.01) |
| H01R 12/58 | (2011.01) |
| H01R 12/70 | (2011.01) |

(Continued)

(52) U.S. Cl.
CPC ................. H02M 7/44 (2013.01); H01R 12/58 (2013.01); H01R 12/7047 (2013.01); H01R 12/75 (2013.01); H01R 13/6595 (2013.01); H05B 37/02 (2013.01); H01R 12/7088 (2013.01)

(58) Field of Classification Search
CPC .................. H03K 19/00361; H03K 19/00315; H03K 17/063; H03K 19/0013; H03K 19/018521; H03K 19/018585; H04L 25/0278; H04L 25/0269

USPC ................................... 315/291–311; 361/818
See application file for complete search history.

(56) References Cited

U.S. PATENT DOCUMENTS

| | | | |
|---|---|---|---|
| 5,738,544 A | 4/1998 | Davis | |
| 6,135,823 A | 10/2000 | Torii | |
| 6,553,911 B1 * | 4/2003 | Walker et al. ............. | 102/202.7 |

(Continued)

FOREIGN PATENT DOCUMENTS

| | | |
|---|---|---|
| CN | 101557059 | 10/2009 |
| CN | 102007646 | 4/2011 |

(Continued)

OTHER PUBLICATIONS

European Search Report from E.P.O. having mail date of Apr. 25, 12014.

(Continued)

*Primary Examiner* — Diana J Cheng
(74) *Attorney, Agent, or Firm* — Greenblum & Bernstein, P.L.C.

(57) ABSTRACT

A power converter includes a mounting substrate, a one-piece-type connector including an input connector and an output connector, the input connector and the output connector being formed in one-piece and arranged side by side; and a case made of an electrically conductive material. The one-piece-type connector includes lead terminals configured to connect the input cable and the output cable to a power converting circuit and an electrically conductive ground connection portion electrically connected to the case through an electrically conductive member. The ground connection portion includes a shield surface arranged to extend along at least a portion of a side surface of the output connector.

10 Claims, 9 Drawing Sheets

(51) Int. Cl.
*H01R 12/75* (2011.01)
*H01R 13/6595* (2011.01)

(56) References Cited

U.S. PATENT DOCUMENTS

| | | |
|---|---|---|
| 2003/0082953 A1 | 5/2003 | Ushio et al. |
| 2009/0091908 A1 | 4/2009 | Clavier et al. |
| 2009/0258514 A1 | 10/2009 | He et al. |
| 2011/0026267 A1 | 2/2011 | Agata et al. |

FOREIGN PATENT DOCUMENTS

| | | |
|---|---|---|
| DE | 10250628 | 5/2003 |
| JP | H11-283712 | 10/1999 |
| JP | 2000-515302 | 11/2000 |
| JP | 2003-132979 | 5/2003 |
| JP | 2006-012536 | 1/2006 |
| JP | 4479369 | 3/2010 |
| JP | 2010-146972 | 7/2010 |
| JP | 2010-198781 | 9/2010 |

OTHER PUBLICATIONS

Chinese Office Action in counterpart application No. 201310065168.6, dated Dec. 26, 2014, and English-translation thereof.
Japanese Office Action in counterpart Japanese application No. 2012-045013 dated May 26, 2015, and English-summary thereof.

* cited by examiner

POWER CONVERTER AND ILLUMINATION DEVICE USING THE POWER CONVERTER

FIELD OF THE INVENTION

The present invention relates to an illumination device that makes use of a power supply device including a power converter and, more particularly, to an EMS (Electromagnetic Susceptance) countermeasure technology for increasing a noise resistance of the power converter.

BACKGROUND OF THE INVENTION

Along with the generalization of an HID (High Intensity Discharge) lamp for motor vehicles, there is an increasing demand for the reduction of a size and a weight of a head lamp unit for the HID lamp. This holds true in case of an LED head lamp unit for motor vehicles.

The head lamp unit includes a head lamp portion and a power supply device. The head lamp portion is a lighting device for emitting light. The head lamp portion includes a socket to which a HID lamp is attached and an ignitor connected to the socket. The power supply device includes a battery power supply and a voltage converter for converting a voltage of the electric power supplied from the battery power supply and outputting the electric power to the ignitor. The voltage converter includes an input connector to which an input cable for supplying the electric power from the battery power supply is connected and an output connector to which an output cable for outputting the electric power to the ignitor is connected. In recent years, with a view to reduce the size of a head lamp unit and to save costs, there is known a power converter that makes use of a one-piece-type connector in which two input and output connectors are one-piece formed with each other (see, e.g., Japanese Patent Application Publication No. 2003-132979). There is also known a power converter in which a mounting substrate of a power converter circuit having input and output connectors is fixed to an accommodation case by screws (see, e.g., Japanese Patent No. 4479369)

The aforementioned power converter circuit is typically formed of an inverter, a chopper circuit and so forth. It is known that, depending on a loop antenna model or the like, the power converter circuit tends to generate a radiation noise affecting an output voltage. In order to reduce the size of the power converter, however, it is required to remove an unnecessary noise or to suppress the influence of the radiation noise at a significantly high level. In the event that an input connector and an output connector are one-piece formed with each other, the electric power inputted to the input connector is highly susceptible to a noise contained in the electric power outputted from the output connector. This is one of the causes hindering the size reduction of the power converter employing a one-piece-type connector.

SUMMARY OF THE INVENTION

In view of the above, the present invention provides a power converter capable of reducing the size of a one-piece-type connector and capable of increasing an EMS resistance, and an illumination device using the power converter.

In accordance with one aspect of the present invention, there is provided a power converter, including: a mounting substrate mounted with a power converting circuit for converting electric power supplied from a power supply and supplying the converted electric power to a load; a one-piece-type connector including an input connector by which an input cable for inputting the electric power supplied from the power supply to the power converting circuit is connected to the mounting substrate and an output connector by which an output cable for outputting the converted electric power to the load is connected to the mounting substrate, the input connector and the output connector being formed in one-piece and arranged side by side; and a case made of an electrically conductive material and configured to accommodate the mounting substrate and the one-piece-type connector, wherein the one-piece-type connector includes lead terminals configured to connect the input cable and the output cable to the power converting circuit and an electrically conductive ground connection portion electrically connected to the case through an electrically conductive member, the ground connection portion including a shield surface arranged to extend along at least a portion of a side surface of the output connector.

Preferably, the one-piece-type connector may further include a connecting portion to interconnect the input connector and the output connector, the ground connection portion including a base portion installed on the connecting portion and an upstanding portion standing up from the base portion to extend along a side surface of the output connector, the upstanding portion serving as the shield surface.

Preferably, the electrically conductive member may include a screw extending through the base portion and the mounting substrate to fix the ground connection portion to the case.

Preferably, the ground connection portion further may include leg portions extending from the base portion so as to make contact with the mounting substrate, each of the leg portions including a bent portion flexed depending on a difference in an attachment height of the lead terminals with respect to the mounting substrate.

Preferably, the electrically conductive member may include a grounding circuit formed on the mounting substrate, the leg portions making contact with the grounding circuit.

Preferably, the mounting substrate may have through-holes formed at adjacent positions with a mounting position of the connecting portion of the one-piece-type connector interposed therebetween, the ground connection portion including leg portions inserted into the through-holes and configured to fix the one-piece-type connector at a predetermined height by being locked to the through-holes in a state that the base portion is mounted to the connecting portion.

Preferably, the mounting substrate may have through-holes formed at adjacent positions with a mounting position of the connecting portion of the one-piece-type connector interposed therebetween, the leg portions being inserted into the through-holes and being configured to fix the one-piece-type connector at a predetermined height by being locked to the through-holes in a state that the base portion is mounted to the connecting portion.

Preferably, each of the lead terminals may include a crank-shaped bent portion flexed depending on a change in a distance between the one-piece-type connector and the mounting substrate.

Preferably, the crank-shaped bent portion of the lead terminal for the input connector and the crank-shaped bent portion of the lead terminal for the output connector may be oriented in mutually different directions.

Preferably, each of the lead terminals may have a tip end bent to extend along a surface of the mounting substrate so that the tip end is surface-mounted to the mounting substrate.

Preferably, the power converting circuit may include an inverter circuit.

In accordance with another aspect of the present invention, there is provided an illumination device, including: the power converter of above disclosed one aspect of the present invention; a power supply configured to supply electric power to the power converter; a lighting device as a load for receiving the electric power outputted from the power converter and emitting light; an input cable extending from the power supply, the input cable being connected to the input connector of the one-piece-type connector of the power converter; and an output cable extending to the lighting device, the output cable being connected to the output connector.

Preferably, the lighting device may include an igniter connected to the power converter and an HID lamp connected to the igniter.

With the present embodiment, the one-piece-type connector of the power converter includes a ground connection portion having a shield surface on at least a portion of the side surface near the output connector. The ground connection portion guides an unnecessary radiation noise, which would otherwise be inputted from the output connector to the input connector, toward the case. It is therefore possible to increase the EMS resistance of the power converter and to reduce the size of the one-piece-type connector.

DETAILED DESCRIPTION OF THE EMBODIMENTS

Figure 1:
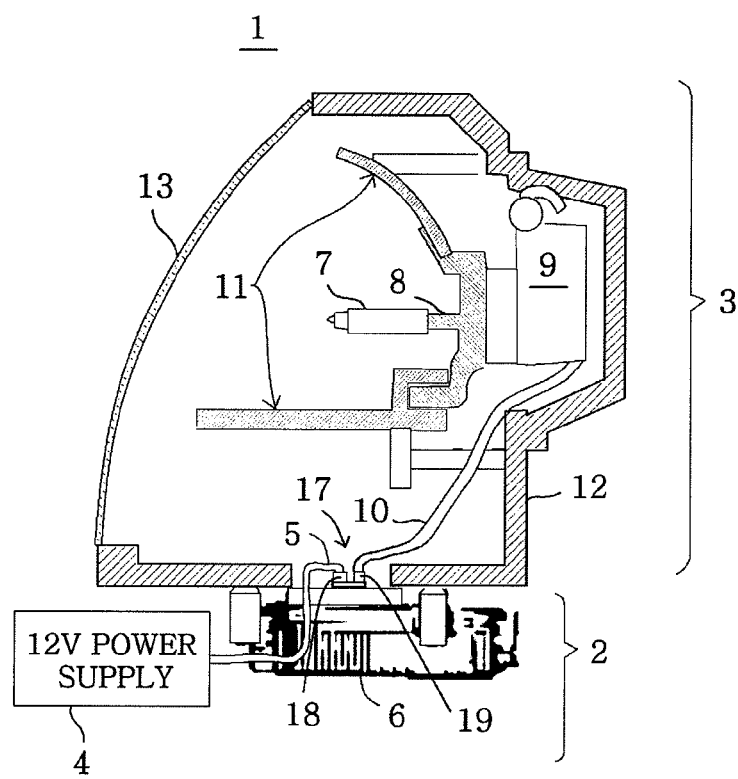
FIG. 1 is a section view showing the configuration of an HID head lamp unit that makes use of a power supply device including a power converter according to one embodiment of the present invention.
Figure 2:
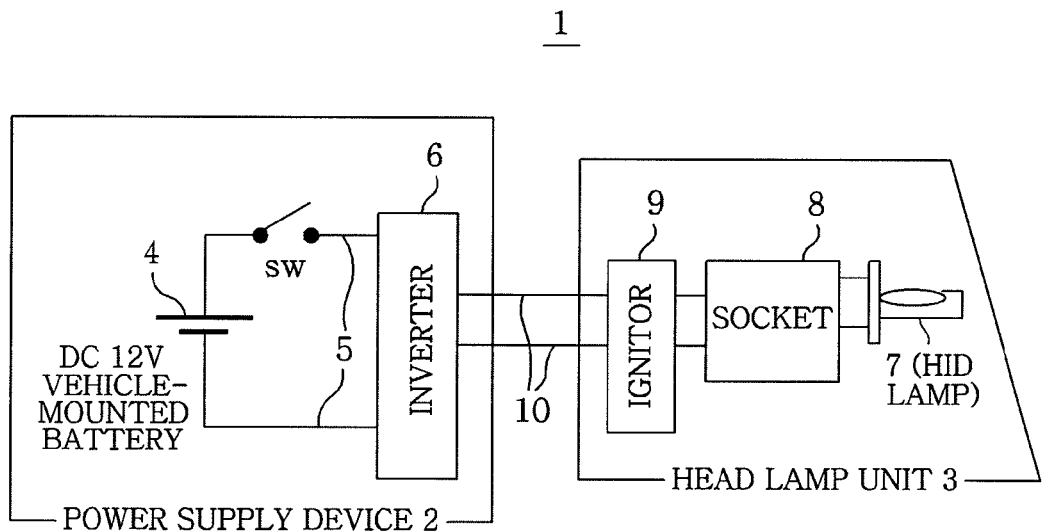
FIG. 2 is a circuit diagram of the HID head lamp unit.

FIG. 1 is a section view showing an HID head lamp unit 1 that makes use of a power converter 6 in accordance with one embodiment of the present invention. FIG. 2 is a schematic circuit diagram of the HID head lamp unit 1. The HID head lamp unit 1 includes a power supply device 2 and a head lamp portion 3. The power supply device 2 includes a vehicle-mounted battery 4 having an output power of 12 V and a power converter 6 to which DC power is inputted from the battery 4 through a switch SW and an input cable 5. The power converter 6 includes a DC/AC converting circuit 16 including an inverter circuit as a power converting circuit. The power converter 6 converts a DC voltage of 12 V to a high-frequency AC voltage having a frequency of 20 kHz to 100 kHz and outputs the AC voltage thus converted.

The head lamp portion 3 is a lighting device for emitting light. The head lamp portion 3 includes a HID lamp 7, a socket 8, an ignitor 9 supplying electric power to the socket 8, an output cable 10, a reflecting plate 11, a lamp case 12 accommodating the components mentioned just above, and a light lens 13. The HID lamp 7 is mounted to the socket 8. The output cable 10 interconnects the power converter 6 and the ignitor 9. The power converter 6 includes a one-piece-type connector 17 in which an input connector 18 connected to the input cable 5 and an output connector 19 connected to the output cable 10 are arranged in adjacent positions and are one-piece formed with each other. The ignitor 9 increases the output voltage of the power converter 6 to about 25 kV and outputs the voltage thus increased. In the head lamp unit 1, other configurations than the power converter 6 is well-known in the art and will not be described in detail herein.

Figure 3A:
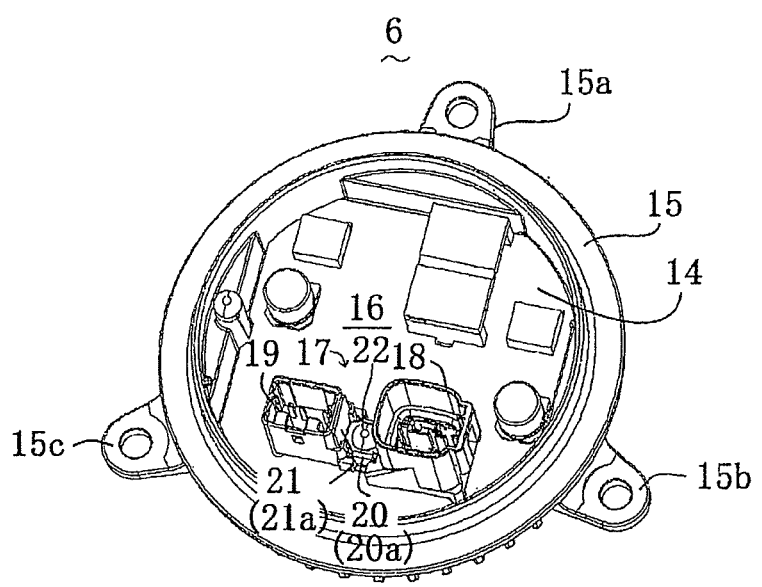
FIG. 3A is a perspective view showing the overall configuration of the power converter according to one embodiment of the present invention and FIG. 3B is an exploded perspective view showing a mounting substrate and a case of the power converter.
Figure 3B:
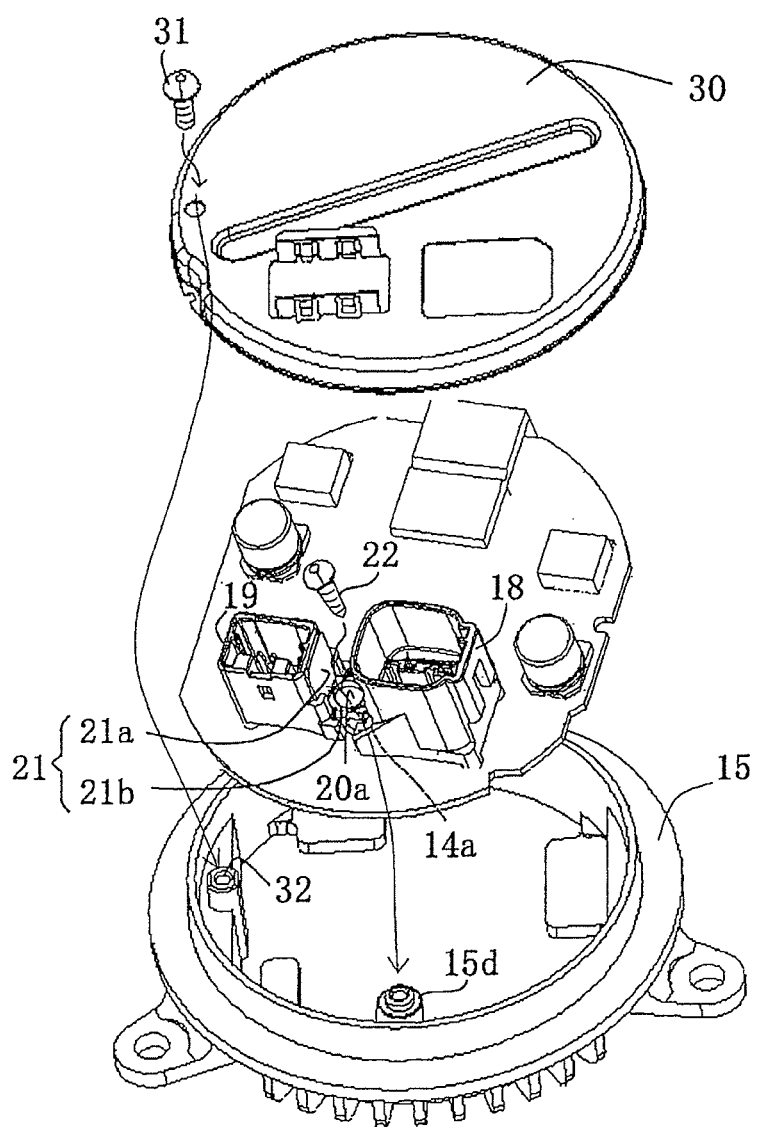

FIG. 3A is a perspective view of the power converter 6 and FIG. 3B is an exploded perspective view of the power converter 6. The power converter 6 includes a mounting substrate 14 having an electric insulation property, an aluminum-die-cast case 15 as an electrically conductive member for accommodating the mounting substrate 14, and a case cover 30 for covering the case 15. The case 15 has screw holes 15a, 15b and 15c used in attaching the power converter 6 to an attachment frame of a motor vehicle or the like not shown in the drawings. The case 15 serves as a grounding mechanism with respect to the mounting substrate 14.

The DC/AC converting circuit 16 and the one-piece-type connector 17, to which the input and output cables (the cables 5 and 10 shown in FIG. 2) are connected, are mounted to the mounting substrate 14. The one-piece-type connector 17 includes an input connector 18 to which the input cable 5 shown in FIG. 2 is connected, an output connector 19 to which the output cable 10 is connected, a connecting portion 20 for interconnecting the two connectors 18 and 19, and a ground connection portion 21. The ground connection portion 21, the connecting portion 20, and the mounting substrate 14 have through-holes 21b, 20a and 14a into which screws 22 are inserted. In the following description, for the sake of convenience in description, the structure formed of the input connector 18, the output connector 19, and the connecting portion 20 will be referred to as a body of the one-piece-type connector 17.

The ground connection portion 21 provided above the connecting portion 20 has a shield surface 21a standing up along a portion of the side surface of the output connector (see FIG. 4A to be described later). The ground connection portion 21 is fixed to the one-piece-type connector 17 by inserting a set screw 22 as an electrically conductive member into the through-hole 21b of the ground connection portion 21, the through-hole 20a of the connecting portion 20, and a through-hole 14a of the mounting substrate 14 and then tightening the set screw 22 to a thread hole 15d of the case 15. Since the ground connection portion 21 is connected to the electrically conductive case 15 by the set screw 22, the unnecessary radiation noise outputted from the output connector 19 is guided toward the case 15 by the ground connection portion 21. This reduces the influence of the unnecessary radiation noise on the input connector 18. Accordingly, it is possible to shorten the distance between the input connector 18 and the output connector 19. As a result, it becomes possible to reduce the size of the power converter 6 employing the one-piece-type connector 17.

Due to the vibration transmitted from a motor vehicle to which the head lamp unit 1 is attached, the one-piece-type connector 17 may be applied with a pulling force through the cables 5 and 10 connected to the input connector 18 and the output connector 19.

Since the one-piece-type connector 17 is screw-fixed to the case 15, the one-piece-type connector 17 has an increased resistance against the pulling force. Since the ground connection portion 21 is directly connected to the case 15, there is provided an advantage that an unnecessary antenna loop as a cause of generating a noise is not formed in the mounting substrate 14.

Description will now be made on a manufacturing method of the power converter 6. First, the lead terminals (see FIG. 5) of the body of the one-piece-type connector 17 are mounted into the through-holes of the mounting substrate 14. Then, the ground connection portion 21, the body of the one-piece-type connector 17 and the mounting substrate 14 are fixed to the case 15 by the screw 22. Thereafter, the mounting substrate 14 is potted (heaped) with a filler material. After the filler material is cured, the case cover 30 is attached to the case 15 by inserting the screw 31 through the case cover 30 and tightening the screw 31 to the thread hole 32. The power converter 6 is manufactured in the aforementioned order.

Figure 4A:
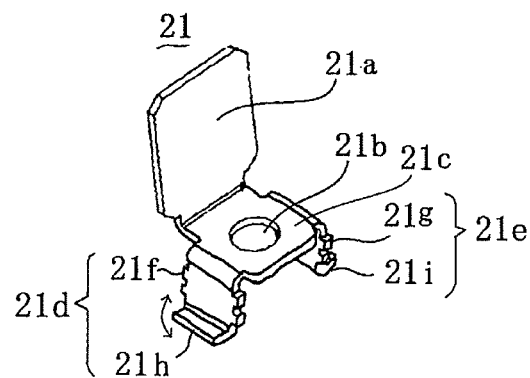
FIG. 4A is a perspective view of a ground connection portion for use in a one-piece-type connector attached to the power converter.
Figure 4B:
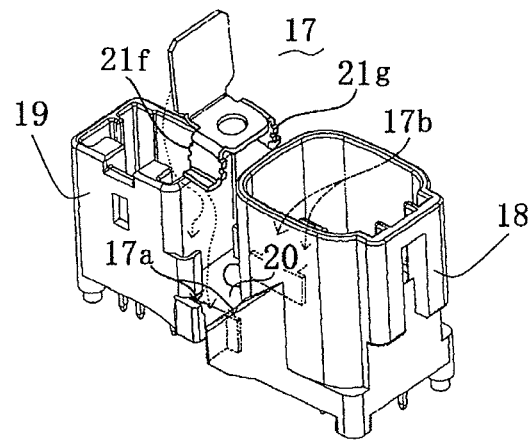
FIG. 4B is a perspective view for explaining how to install the ground connection portion to a one-piece-type connector and FIG. 4C is a perspective view of the one-piece-type connector completed.
Figure 4C:
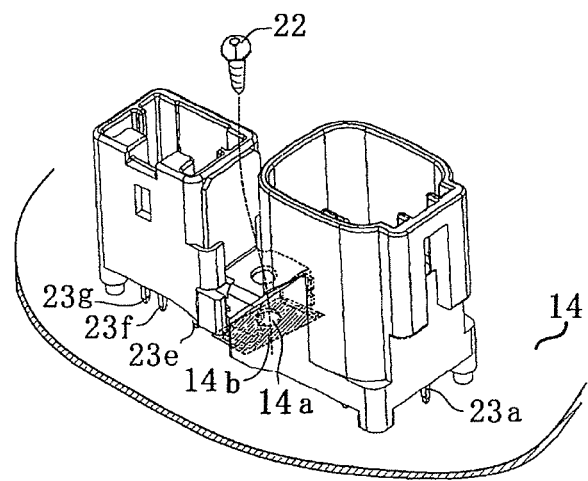

FIG. 4A is a perspective view showing the configuration of the ground connection portion 21. FIG. 4B is a perspective view for explaining how to attach the ground connection portion 21 to the body of the one-piece-type connector 17. FIG. 4C is a perspective view of the one-piece-type connector 17 mounted to the mounting substrate 14. The ground connection portion 21 includes a base portion 21c installed on the connecting portion 20, an upstanding portion having a shield surface 21a standing up from the base portion 21c along the side surface of the connecting portion 20 of the output connector 19, and plate-like leg portions 21d and 21e. The shield surface 21a is arranged on at least a portion of the side surface of the output connector 19. For example, the shield surface 21a may stand up so as to extend along the surface of the leg portion 21d or 21e. Since the shield surface 21a is arranged to exist between the input connector 18 and the output connector 19 as shown in the drawings, it is possible to effectively reduce the influence of a noise on the input connector 18. The mounting substrate 14 includes a rectangular grounding wiring line 14b (hatched in FIG. 4C) through which the through-hole 14a extends. The grounding wiring line 14b is an electrically conductive member differing from the screw 22. The leg portions 21d and 21e extend from the base portion 21c toward the mounting substrate 14 and have a length large enough to make contact with the grounding wiring line 14b. The one-piece-type connector 17 has slit-shaped grooves 17a and 17b (see FIG. 5A) to which the leg portions 21d and 21e are fitted when the base portion 21c of the ground connection portion 21 is placed on the connecting portion 20. The leg portions 21d and 21e have lug portions 21f and 21g formed at the opposite sides thereof. The lug portions 21f and 21g are locked inside the grooves 17a and 17b to fix the ground connection portion 21 to the one-piece-type connector 17.

The ground connection portion 21 is connected to the case 15 through the screw 22. Since the leg portions 21d and 21e make contact with the grounding wiring line 14b, the noise grounding route is increased and the electric resistance is reduced. This makes it possible to stably reduce the noise. The grounding wiring line 14b is preferably formed into a linear shape including the through-hole 14a as shown in FIG. 4C, so as not to form an antenna loop as a cause of generating an unnecessary noise.

Figure 5A:
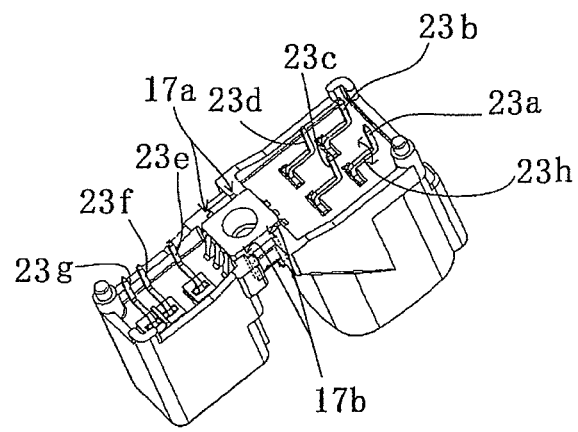
FIG. 5A is a perspective view showing a lead terminal provided in the bottom of the one-piece-type connector and FIG. 5B is a side view showing the lead terminal soldered to the mounting substrate.

The one-piece-type connector 17 includes lead terminals 23a through 23g arranged on the lower surface thereof (see FIG. 5A). The lead terminals 23a through 23g extend so that one ends thereof can be electrically connected to the connectors of the input cable 5 and the output cable 10 and the other ends thereof can be inserted into the through-holes formed in the mounting substrate 14. The other ends of the lead terminals 23a through 23g are mounted (soldered) to the mounting substrate 14 through through-holes formed in the mounting substrate 14. Then, the ground connection portion 21 is attached to the connecting portion 20 by the screw 22. The leg portions 21d and 21e include bent portions 21h and 21i formed at the tip ends thereof so that the bent portions 21h and 21i can be flexed when the ground connection portion 21 is pressed downward. The bent portions 21h and 21i are flexed depending on the difference in the installation height of the lead terminals 23a through 23g attributable to the manufacturing error or the use environment. Thus the bent portions 21h and 21i keep the lead terminals 23a through 23g in good contact with the grounding wiring line 14b. While the bent portions 21h and 21i are connected to the grounding wiring line 14b by pressure contact, it may be possible to solder the bent portions 21h and 21i to the grounding wiring line 14b after the ground connection portion 21 is installed in place.

Figure 5B:
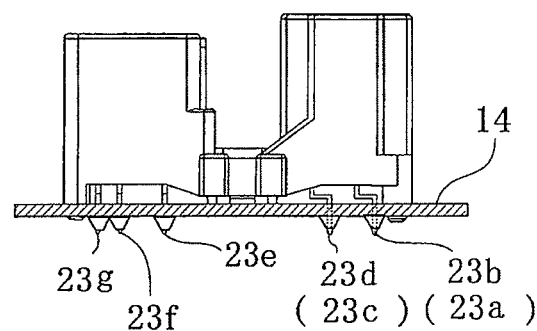

FIG. 5A is a perspective view showing the lead terminals 23a through 23g of the one-piece-type connector 17. FIG. 5B is a side view showing the one-piece-type connector attached to the mounting substrate 14. Since the respective lead terminals 23a through 23g are identical in shape, only the lead terminal 23a will be described herein below. As shown in FIGS. 5A and 5B, the lead terminal 23a includes a crank-shaped bent portion 23h extending parallel to the mounting substrate 14. When the ground connection portion 21 is attached to the connecting portion 20 by the screw 22, the leg portions 21d and 21e of the ground connection portion 21 exert forces by which the body of the one-piece-type connector 17 is urged to move away from the mounting substrate 14. However, the crank-shaped bent portion 23h is flexed to absorb the forces, thereby preventing the lead terminal 23a from being separated from a solder. Similarly, the crank-shaped bent portion 23h can prevent the lead terminal 23a from being separated from a solder, in the event that the distance between the body of the one-piece-type connector 17 and the mounting substrate 14 is changed depending on the use environment after the bent portions 21h and 21i are soldered to the grounding wiring line 14b. The distance change caused by the use environment is generated by, e.g., the temperature change or the vibration transmitted from a motor vehicle to which the case 15 is attached. While the opposite ends of the crank-shaped bent portion 23h are bent at 90 degrees, they may be bent at an obtuse angle as long as the function of the crank-shaped bent portion 23h flexed depending on the change in the distance between the connector 17 and the mounting substrate 14 is not impaired. The crank-shaped bent portions of the lead terminals 23a through 23d of the input connector 18 and the crank-shaped bent portions of the lead terminals 23e through 23g of the output connector 19 may be oriented in the same direction or may be oriented in different directions, e.g., in 90-degree different directions as shown in FIG. 5A. This makes it possible to reduce the change in the posture of the one-piece-type connector 17 caused by the lead terminal 23a being flexed.

Figure 6:
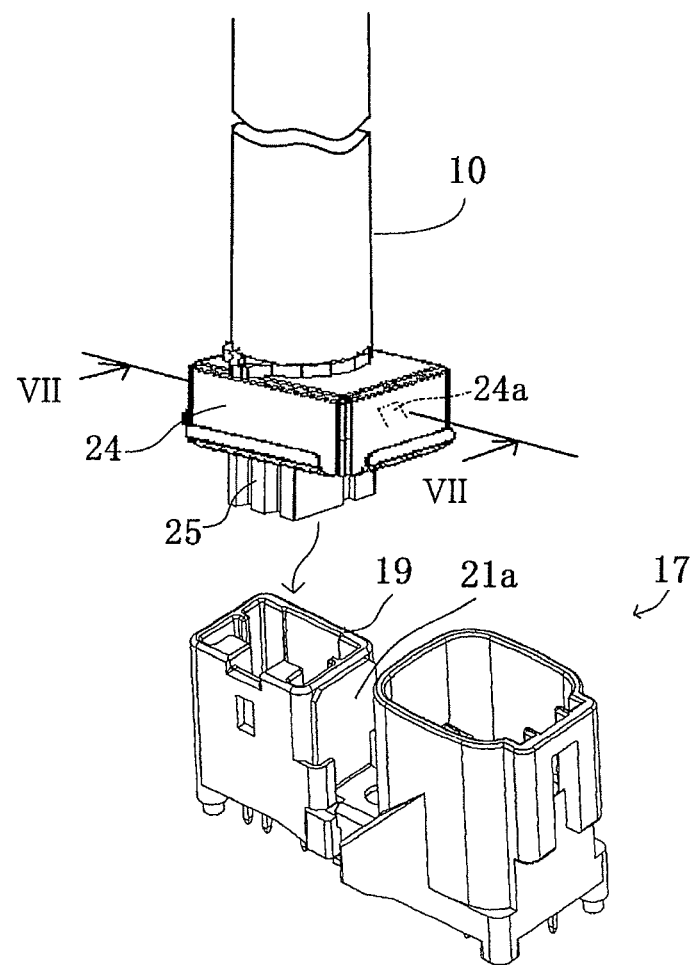
FIG. 6 is a perspective view illustrating how to connect a shielded output cable to the one-piece-type connector.
Figure 7:
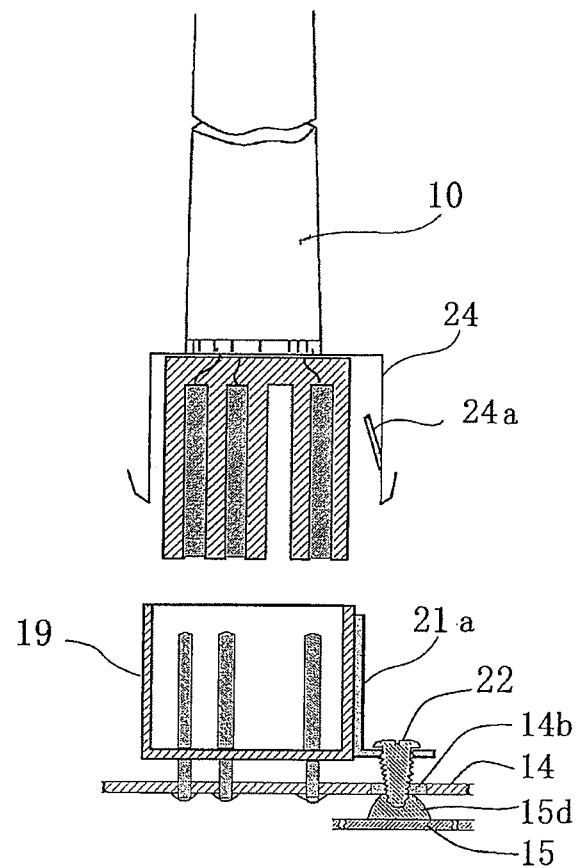
FIG. 7 is a section view of the one-piece-type connector and the shielded output cable.

FIG. 6 is a perspective view illustrating how to connect the output cable 10 to the output connector 19 of the one-piece-type connector 17. The output cable 10 includes a shield member 24 arranged at the tip end thereof to completely cover the output connector 19. FIG. 7 is a section view of the output cable 10 taken along line VII-VII in FIG. 6.

The shield member 24 of the output cable 10 includes a connection member 24a protruding inward. Upon inserting a connector 25 of the tip end of the output cable 10 into the output connector 19 of the one-piece-type connector 17, the connection member 24a is connected to the shield surface 21a of the ground connection portion 21. If the shield surface 21a of the ground connection portion 21 is formed on only the side surface of the output connector 19 facing the connecting portion 20, the output cable 10 having the shield member 24 reduces the influence of a noise on the signal flowing not only through the input connector 18 but also through the wiring line of the mounting substrate 14. If the shield surface of the ground connection portion 21 is formed to surround the side surface of the output connector 19, the same noise reduction effect can be obtained even when an output cable not provided with the shield member 24 is used in place of the output cable 10. For the sake of understanding of the invention, FIG. 7 shows a state that the ground connection portion 21 and the grounding wiring line 14b of the mounting substrate 14 are electrically connected to the thread hole 15d of the case 15 by the screw 22.

As described above, the power converter 6 is configured to increase the EMS resistance of the one-piece-type connector 17 using the ground connection portion 21 and to reduce the size of the one-piece-type connector 17. It is also possible to reduce the overall size of the head lamp unit 1 as an illumination device employing the power converter 6. Since the one-piece-type connector 17 and the ground connection portion 21 are directly attached to the case 15 by use of the screw 22, the length of the grounding wiring line is reduced and the generation of the unnecessary noise is prevented. Since the one-piece-type connector is directly connected to the case, the one-piece-type connector has an increased resistance against the pulling force of the cables connected to the input connector 18 and the output connector 19. Since one or both of the ground connection portion 21 and the lead terminals 23a through 23g is provided with the bent portions, the solder portions of the ground connection portion 21 and the lead terminals 23a through 23g are applied with low stresses and are prevented from being separated from the mounting substrate 14.

Preferably, the one-piece-type connector 17 and the ground connection portion 21 are directly attached to the case 15 by use of the screw 22. Considering the circuit design of the mounting substrate 14, it may be possible to employ a configuration in which the one-piece-type connector 17 and the ground connection portion 21 are attached to the mounting substrate 14 by the screw 22 and then connected to the case 15 by way of one or both of the screw 22 and the leg portions 21d and 21e. In this case, it is possible to obtain the noise reduction effect provided by the ground connection portion 21. Since one or both of the ground connection portion 21 and the lead terminal 17b of the one-piece-type connector 17 is provided with the bent portions, the solder portions of the ground connection portion 21 and the lead terminals 23a through 23g are applied with low stresses and are prevented from being separated from the mounting substrate 14.

FIRST MODIFIED EXAMPLE

Figure 8A:
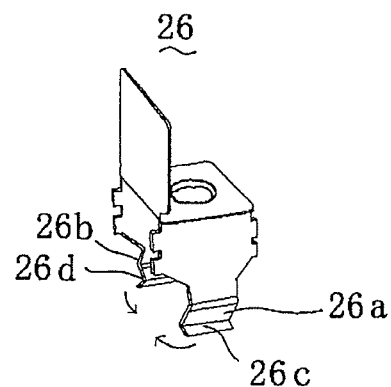
FIG. 8A is a perspective view of a ground connection portion having leg portions locked to a mounting substrate in a first modified example of the aforementioned embodiment.
Figure 8B:
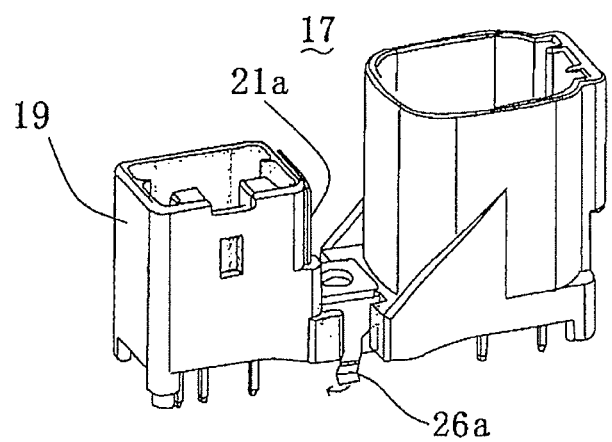
FIG. 8B is a perspective view showing the ground connection portion attached to the one-piece-type connector body and FIG. 8C is a section view of the ground connection portion gripping and holding the mounting substrate.
Figure 8C:
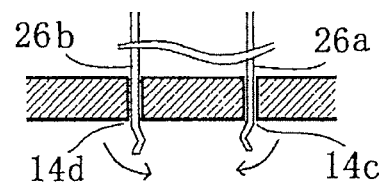

FIG. 8A is a perspective view showing a ground connection portion 26 in accordance with a first modified example. FIG. 8B is a perspective view of the one-piece-type connector 17 to which the ground connection portion 26 is mounted. The ground connection portion 26 includes a pair of leg portions 26a and 26b differing in shape from the ground connection portion 21 described above. FIG. 8C is a section view showing the leg portions 26a and 26b attached to the mounting substrate 14. The mounting substrate 14 includes a pair of through-holes 14c and 14d formed at adjacent positions with the mounting position of the connecting portion 20 interposed therebetween. The tip ends of the leg portions 26a and 26b come close toward each other so that the leg portions 26a and 26b, when inserted into the through-holes 14c and 14d, grip the mounting substrate 14 and fix the body of the one-piece-type connector 17 at a predetermined height. For the removal-preventing purpose, the leg portions 26a and 26b are provided at the tip ends with locking portions 26c and 26d bent such that locking portions 26c and 26d extend toward each other and then extend away from each other. The ground connection portion 26 is formed of an electrically conductive spring member having a thickness of, e.g., 0.4 mm or less. Since the one-piece-type connector 17 mounted with the ground connection portion 26 is fixed to the mounting substrate 14 at the predetermined height, it is possible to prevent the body of the one-piece-type connector 17 from floating when the lead terminals 23a through 23g are soldered. In other words, the locking portions 26c and 26d have an advantage in that there is no need to use a jig for tentatively pressing the body of the one-piece-type connector 17 and preventing the floating of the body of the one-piece-type connector 17.

If the grounding wiring line 14b is not formed on the mounting substrate 14 and if the ground connection portion 26 is not soldered to the mounting substrate 14, the locking portions 26c and 26d are arranged in such positions where the locking portions 26c and 26d can move up and down by a little distance (e.g., 0.1 mm) in a state that the ground connection portion 26 grips the mounting substrate 14. The portions movable in the up-down direction have an advantage in that they can absorb the stresses attributable to the change in the distance between the one-piece-type connector 17 and the mounting substrate 14 when the one-piece-type connector 17 and the mounting substrate 14 are fixed to the case 15 by the screw 22 and when the illumination device is normally used. Even if the grounding wiring line 14b is formed on the mounting substrate 14, there is provided an advantage in that, after the one-piece-type connector 17 is attached to the case 15, the ground connection portion 26 can be soldered to the mounting substrate 14 in such a position where the ground connection portion 26 does not apply any load on the soldered portions of the lead terminals 23a through 23g.

The locking portions 26c and 26d may have other well-known shapes as long as the aforementioned advantages can be provided by fixing the body of the one-piece-type connector at the predetermined height while assuring the easy insertion of the locking portions 26c and 26d into the through-holes 14c and 14d. Instead of gripping the mounting substrate 14, the locking portions 26c and 26d may have, e.g., a snap-fit shape so that the locking portions 26c and 26d can pass through the through-holes 14c and 14d and can interpose the front and rear surfaces of the mounting substrate 14 therebetween.

A curved portion having a U-like cross-sectional shape or a crank-shaped bent portion having the same shape as the crank-shaped bent portion 23h of the lead terminal 23a may be formed in the region of each of the leg portions 26a and 26b nearer to the base end than the locking portions 26c and 26d. In this case, it is possible to further enhance the ability to absorb the stresses attributable to the change in the distance between the one-piece-type connector 17 and the mounting substrate 14.

SECOND MODIFIED EXAMPLE

Figure 9A:
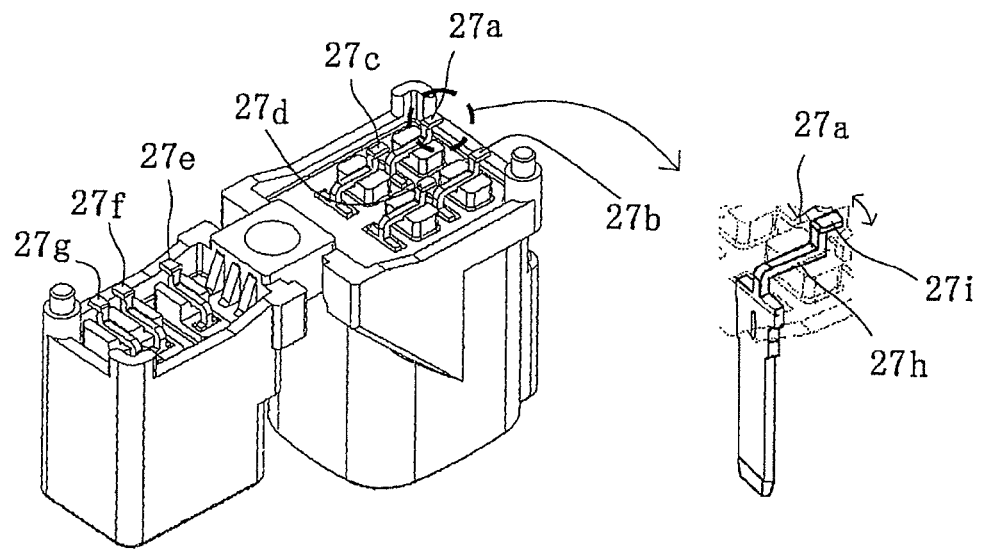
FIG. 9A is a perspective view of a one-piece-type connector having a surface-mounting lead terminal in a second modified example of the aforementioned embodiment, with the lead terminal illustrated on an enlarged scale.
Figure 9B:
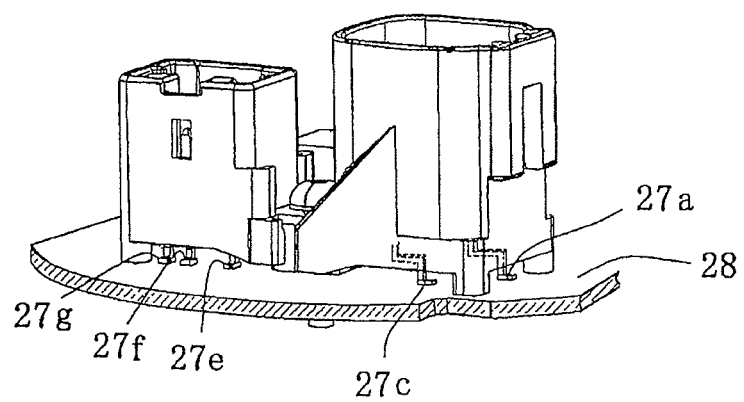
FIG. 9B is a perspective view of the one-piece-type connector surface-mounted to the mounting substrate.

FIG. 9A is a perspective view of a one-piece-type connector 27 in accordance with a second modified example, which has lead terminals 27a through 27g not through-hole-mounted but surface-mounted to the mounting substrate 14. In FIG. 9A, the lead terminal 27a is shown on an enlarged scale. FIG. 9B is a perspective view of the one-piece-type connector 27 surface-mounted to the double-side mounting substrate 28. Other configurations of the one-piece-type connector 27 than the lead terminals, including the ground connection portion 21 or 26, remain the same as the configurations of the one-piece-type connector 17. The lead terminals 27a through 27g are identical in configuration. Description will now be made on the lead terminal 27a. The lead terminal 27a includes not only a crank-shaped bent portion 27h flexed to absorb the change in the distance between the lead terminal 27a and the double-side mounting substrate 28 but also a surface-mounted bent portion 27i which is bent to extend along the surface of the substrate 28. With this configuration, the one-piece-type connector 27 is surface-mounted to the substrate 28.

The configurations of the power converter in accordance with the present invention are not limited to the configurations of the embodiment and the modified examples described above but may be modified in many different forms without departing from the scope and spirit of the invention. For example, contact points connected to the grounding wiring line may be formed inside the through-holes 14c and 14d of the mounting substrate 14. The locking portions of the ground connection portion 26 may not be soldered to the substrate. In this case, the locking portions 26c and 26d are movable in the up-down direction. This provides an advantage in that it is possible to reduce the stresses applied to the lead terminals of the one-piece-type connector 17 and to increase the grounding route.

The power converter in accordance with the present invention can find its application not only in a motor vehicle but also in a variety of illumination devices that require an increased resistance against the noise generated in a power converting circuit.

While the invention has been shown and described with respect to the embodiments, the present invention is not limited thereto. It will be understood by those skilled in the art that various changes and modifications may be made without departing from the scope of the invention as defined in the following claims.

What is claimed is:

1. A power converter, comprising:
a mounting substrate mounted with a power converting circuit for converting electric power supplied from a power supply and supplying the converted electric power to a load;
a one-piece-type connector including an input connector by which an input cable for inputting the electric power supplied from the power supply to the power converting circuit is connected to the mounting substrate and an output connector by which an output cable for outputting the converted electric power to the load is connected to the mounting substrate, the input connector and the output connector being formed in one-piece and arranged side by side; and
a case made of an electrically conductive material and configured to accommodate the mounting substrate and the one-piece-type connector,
wherein the one-piece-type connector includes lead terminals configured to connect the input cable and the output cable to the power converting circuit and an electrically conductive ground connection portion electrically connected to the case through an electrically conductive member, the ground connection portion including a shield surface arranged to extend along at least a portion of a side surface of the output connector,
wherein the one-piece-type connector further includes a connecting portion to interconnect the input connector and the output connector, the ground connection portion including a base portion installed on the connecting portion and an upstanding portion standing up from the base portion to extend along a side surface of the output connector, the upstanding portion serving as the shield surface,
wherein the ground connection portion further includes leg portions extending from the base portion so as to make contact with the mounting substrate, each of the leg portions including a bent portion flexed depending on a difference in an attachment height of the lead terminals with respect to the mounting substrate, and
wherein the electrically conductive member includes a grounding circuit formed on the mounting substrate, the leg portions making contact with the grounding circuit.

2. The power converter of claim 1, wherein the electrically conductive member includes a screw extending through the base portion and the mounting substrate to fix the ground connection portion to the case.

3. The power converter of claim 1, wherein the mounting substrate has through-holes formed at adjacent positions with a mounting position of the connecting portion of the one-piece-type connector interposed therebetween, the leg portions being inserted into the through-holes and being configured to fix the one-piece-type connector at a predetermined height by being locked to the through-holes in a state that the base portion is mounted to the connecting portion.

4. The power converter of claim 1, wherein each of the lead terminals includes a crank-shaped bent portion flexed depending on a change in a distance between the one-piece-type connector and the mounting substrate.

5. The power converter of claim 4, wherein the crank-shaped bent portion of the lead terminal for the input connector and the crank-shaped bent portion of the lead terminal for the output connector are oriented in mutually different directions.

6. The power converter of claim 5, wherein the power converting circuit includes an inverter circuit.

7. The power converter of claim 1, wherein each of the lead terminals has a tip end bent to extend along a surface of the mounting substrate so that the tip end is surface-mounted to the mounting substrate.

8. An illumination device, comprising:
the power converter of claim 1;
a power supply configured to supply electric power to the power converter;
a lighting device as a load for receiving the electric power outputted from the power converter and emitting light;
an input cable extending from the power supply, the input cable being connected to the input connector of the one-piece-type connector of the power converter; and
an output cable extending to the lighting device, the output cable being connected to the output connector.

9. The illumination device of claim 8, wherein the lighting device includes an igniter connected to the power converter and an HID lamp connected to the igniter.

10. The power converter of claim 1, wherein one end of each of the lead terminals is inserted into a through-hole formed in the mounting substrate.

\* \* \* \* \*